United States Patent [19]
Webb

[11] Patent Number: 4,964,594
[45] Date of Patent: Oct. 23, 1990

[54] BLIND FASTENER HAVING SPECIAL UTILITY IN THE INSTALLATION OF TRANSPARENCIES IN AIRCRAFT AND THE LIKE

[75] Inventor: Roger M. Webb, Dallas, Tex.

[73] Assignee: Texstar, Inc., Grand Prairie, Tex.

[21] Appl. No.: 179,976

[22] Filed: Apr. 11, 1988

[51] Int. Cl.$^5$ ............................ F16B 37/04; B64C 1/12
[52] U.S. Cl. ................................... 244/131; 411/373; 411/431; 411/103; 244/129.3; 244/132
[58] Field of Search ............ 244/132, 121, 131, 129.3; 411/108, 105, 103, 111, 173, 177, 371, 372, 373, 377, 429, 431, 965, 970, 999

[56] References Cited

U.S. PATENT DOCUMENTS

| | | | |
|---|---|---|---|
| 2,102,558 | 12/1937 | Johnson | 411/177 |
| 2,258,724 | 10/1941 | Wagner et al. | 244/129.3 |
| 2,511,168 | 6/1950 | Martin et al. | 244/121 |
| 2,637,076 | 5/1953 | Bolte | 244/121 |
| 3,177,916 | 4/1965 | Rosan | 411/103 |
| 3,455,362 | 7/1969 | Mohrman | 411/103 |
| 3,729,040 | 4/1973 | Whiteside et al. | 411/103 |
| 4,004,388 | 1/1977 | Stefanik | 244/121 |
| 4,081,581 | 3/1978 | Littell, Jr. | 244/121 |
| 4,322,195 | 3/1982 | Rebish et al. | 411/431 |

*Primary Examiner*—Joseph F. Peters, Jr.
*Assistant Examiner*—Rodney Corl
*Attorney, Agent, or Firm*—Charles W. McHugh

[57] ABSTRACT

A fastening combination adapted for quickly and efficiently connecting a first structure to a second structure using a single tool (like a screwdriver) and from just one side of the two structures. The fastening combination (which may be called a "blind" fastener) is particularly useful in the aircraft industry for installing a transparency such as a canopy or window to the airframe of some plane. A transparency may be removably connected to the airframe with a plurality of internally threaded members (or sleeves) and mating fastening bolts. The sleeves are loosely mounted in a plurality of fastener housings that can be permanently installed near an edge of the transparency. A means is provided for achieving a mechanical connection between each sleeve and an associated housing in such a way that torque applied by the fastening bolt to the sleeve will be resisted by the housing—and in turn by the transparency (or any other mounting structure to which the housing is anchored). This mechanical construction preferably includes an interlocking combination of a recessed shoulder on the housing and a protuberance on the sleeve.

The hollow, cylindrical housing of each blind fastener has a top and a bottom, and the housing is counterbored so as to provide a transversely extending shoulder therein. The sleeve may be selectively inserted into the housing, with the sleeve having a radially extending lip at one end that prevents the sleeve from passing all the way through the housing.

A cap is adapted to be inserted into the housing top, after the sleeve has been inserted therein. The cap is preferably somewhat resilient and it is sized so that it fits tightly into the top of the fastener, so that it will be effective to inhibit the entrance of contaminants and the like into the fastener. The cap ideally has what may be described as an aerodynamically smooth outer surface; and when the cap is installed into the housing top, said outer surface lies in a plane which is established by the top end of the housing.

8 Claims, 2 Drawing Sheets

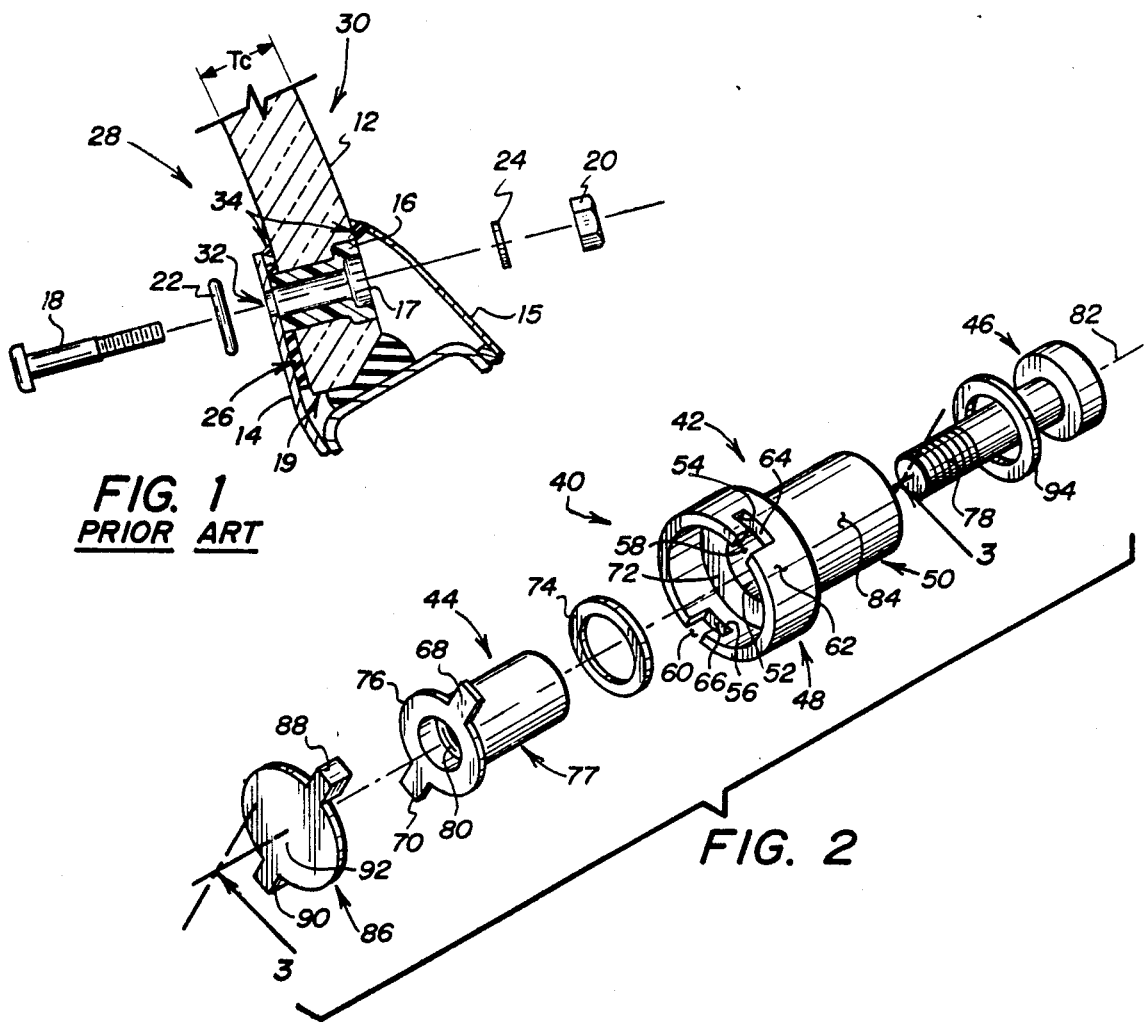
FIG. 1 PRIOR ART
FIG. 2
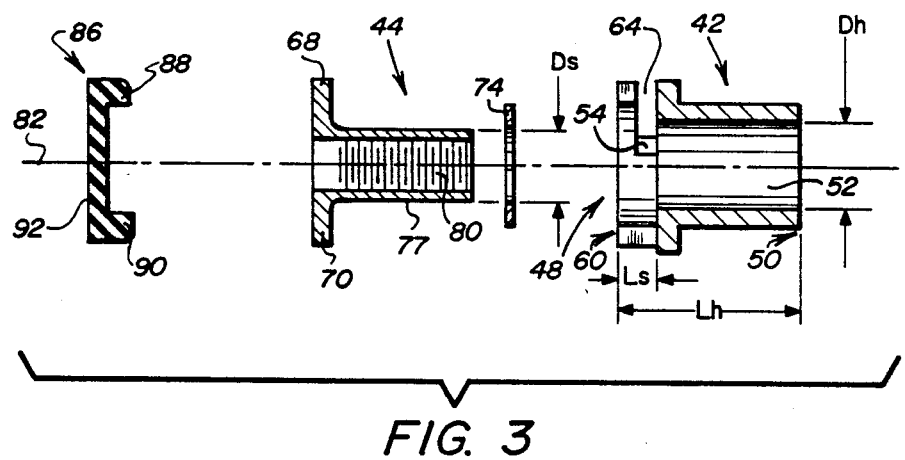
FIG. 3

BLIND FASTENER HAVING SPECIAL UTILITY IN THE INSTALLATION OF TRANSPARENCIES IN AIRCRAFT AND THE LIKE

BACKGROUND OF THE INVENTION

This invention relates generally to fasteners and their use in mounting panels such as transparencies in the walls of vehicles; more specifically, the invention relates to "blind" fasteners and it also relates to their use in installing and/or replacing a window or a canopy or a similar panel in an aircraft or the like.

In the aviation industry it is well known that an aircraft canopy could be become damaged if the aircraft were traveling at a high rate of speed and the canopy were accidentally struck by a bird; of course, other damage to a windshield or the like could occur if the aircraft flew through a sandstorm. The risk of damage in these situations is especially a problem when an aircraft flies at low altitudes while landing or taking off, or while cruising at speeds which could typically range from 250 to 500 knots. If an aircraft canopy were accidentally damaged or needed to be changed for some reason, its prompt replacement might be essential in order for the aircraft to be returned to service in a timely manner. Unfortunately, the current methods for replacing a canopy are rather time-consuming, and they generally require at least two people—each with a separate tool—to tighten or untighten the plurality of small and easily mishandled nuts and bolts that are routinely used to attach the canopy to the airframe. Obviously, minimizing any potential installation delays would be important if an aircraft such as a military jet needed to be flown on a combat mission or the like; hence, a "quick-change" fastening device to speedily replace an aircraft canopy would be highly desirable in many situations, so that the aircraft could be quickly returned to its fully-operational, "ready" state.

One method of installing and replacing a canopy involves the use of polycarbonate bushings which are permanently mounted in a plurality of apertures around a peripheral edge of the canopy. The canopy is placed over the cockpit and a multitude of fastening bolts are inserted through associated bolt holes in the periphery of the airframe opening; the bolts also pass through the bushings in the canopy. Outside the cockpit, nuts and washers are placed over the ends of the bolts that protrude from the bushings. However, the standard way of tightening this type of fastener requires that one person be stationed inside the cockpit to turn and tighten the bolts, and another person must be stationed outside the cockpit to hold a wrench (or some other tool) over the nut to prevent it from turning. While handling these multiple-part fasteners, a person could accidentally drop a small nut or washer, with the result that a part could be lost in the aircraft frame or fall to the ground, thereby further delaying the installation or removal procedure. And if a part were lost inside the aircraft, the part might possibly interfere with the operation of a complex mechanical control system or the sensitive electronics of the aircraft. Also, it would be annoying for a pilot who is making high-speed flight manuevers (such as barrel rolls or loops), to see a loose fastener part being tossed around in the cockpit.

Another problem with this type of fastening device is that the bushing is hollow and shaped in such a way that a liquid (e.g., water, a solvent, de-icing liquid, etc.) could easily collect and stand inside the bushing housing. After a period of time, such liquids could cause a polycarbonate bushing material to deteriorate and crack. Accordingly, there has existed a need for a fastening device that helps seal out liquids and which is configured for a fastening a canopy or the like to an airframe—and which may be fastened or unfastened by only one person, so as to reduce the time and labor required to replace a canopy.

Various prior art devices have been proposed, of course, for fastening a canopy to an airframe, including Martin et al. U.S. Pat. No. 2,511,168 entitled "Construction and Mounting of Units of Transparent Synthetic Resins" and Stefanik U.S. Pat. No. 4,004,388 entitled "Window Panel Edge Construction." The Martin patent discloses a plexiglass canopy or panel structure having a bead around the peripheral edge of the panel. The panel has a socket that is adapted to receive a support structure formed from a wire mesh which is impregnated with a synthetic resin. However, to replace the Martin canopy and its associated support structure, a nut which is mounted exteriorly of the airframe and a bolt which is mounted interiorly of the airframe must generally be manipulated—by two persons. The Stefanik method suffers from some of the same drawbacks as the Martin installation method. That is, the Stefanik method also employs a plurality of nuts and bolts which are fastened around the peripheral edge of a windshield, in order to mount it over an opening in the aircraft fuselage. Of course, with the Stefanik fastener, one person could not easily attach a windshield over a frontal opening in an airframe.

Other prior art shown in Wagner et al. U.S. Pat. No. 2,258,724 entitled "Fixation of Window Panes in Aircraft" teaches a structure that is presumably adapted to mount a dome-shaped convex-concavo window pane in the outer wall of a pressurized compartment. Wagner's primary concern, however, seems to be that of mounting a pane (i.e., a canopy) in such a way that the connection between the canopy and the aircraft walls can withstand the stresses resulting from pressure and temperature differentials—especially when the aircraft is at high altitudes. Wagner teaches the use of a specially molded bead which is integrally formed around the edge portion of the pane; the bead is positioned so that it may be clamped between jaw-like holding members. Regrettably, with such a sophisticated and precisely formed fastening structure, each aircraft canopy would need a specially—and probably expensively—fabricated peripheral bead. And to hold such a canopy in position, custom built jaw-like fastening members would be required for each type of aircraft, thus further increasing the cost to manufacture such a structure. In other words, one jaw-like fastening member could not be readily used to mount different types of aircraft canopies, because each canopy would have its unique, specially shaped bead around the canopy edge.

There are other prior art devices which are related to aircraft canopies or windshield structures, including Littell, Jr. U.S. Pat. No. 4,081,581 entitled "Laminated Aircraft Windshield" and Bolte U.S. Pat. No. 2,637,076 entitled "Reinforced Canopy Structure." However, the Little patent focuses primarily on providing a laminated windshield which purportedlly functions as an energy absorber, so that forces emanating from an impact (such as a bird strike) would be dissipated without penetrating the windshield. And like the Martin and Stefanik fastening methods, Littell discloses a plurality of bolt holes which are provided around the edge of the windshield in order to fasten the windshield to the aircraft fuselage; thus, Littell's method also seems to require at least two persons to replace a windshield.

While most of the above devices have attempted to address the problem of securely mounting a canopy to an airframe, it seems that the designers of these prior art devices have not given as much attention as seems justified to the need to replace a canopy and to efficiently use time and manpower. Therefore, there has remained a need for a "quick-change" fastening device which may readily be fastened or unfastened by just one person, whereby an aircraft canopy may be efficiently replaced in a timely manner. It is an object of this invention to provide such a convenient fastening device.

Another object is to provide a fastener without loose parts (such as a nut and washer) in order to minimize the possibility of accidentally dropping any small parts and losing them in the aircraft or on the floor.

One other object is to provide a fastener which is constructed so that a significant amount of "floating action" may be provided between the canopy and the fuselage, in order to facilitate installation of the canopy—and to prevent stress concentrations from developing as a result of any difference in any expansion or contraction of the canopy and the fuselage.

Still another object is to provide a fastening device having a resilient or rubber-like cap that is sized and shaped to fit into the top of the housing, so as to assist in preventing liquids from collecting in the fastener housing.

One more object is to provide a fastening device having a planar outer surface so as to provide an aerodynamically smooth exposed surface when it is used to install a canopy or the like in an aircraft.

These and other objects will no doubt be apparent from a reading of the specification and claims, and from a study of the accompanying drawings illustrating certain facets of the invention.

DESCRIPTION OF THE FIGURES OF THE DRAWING

FIG. 1 is a fragmentary cross-sectional view of a transparency as it might appear when mounted between a portion of an aircraft frame and a cockpit fairing, and showing an exploded view of a prior art fastening combination before it is assembled for use in attaching the transparency to the frame;

FIG. 2 is a perspective view of a quick-change fastener in accordance with this invention, said fastener including an internally threaded sleeve, a fixed housing and a bolt, and also including optional seals and a resilient cap that is sized and configured so that it may be snugly inserted into the top of the housing;

FIG. 3 is a cross-sectional view of a portion of the elongated fastener taken in a plane through the longitudinal axis of the fastener (represented by the lines 3—3 in FIG. 2), and showing the relative tolerance between the outside diameter of the barrel-like sleeve and the inside diameter of the tubular housing—in this particular embodiment;

FIG. 8 is a fragmentary cross-sectional view of the multi-use fastener as it might appear when mounted in such a way as to fasten a planar member (e.g., an access panel) to a structural part of a cabinet or the like.

BRIEF DESCRIPTION OF THE INVENTION

Figure 4:
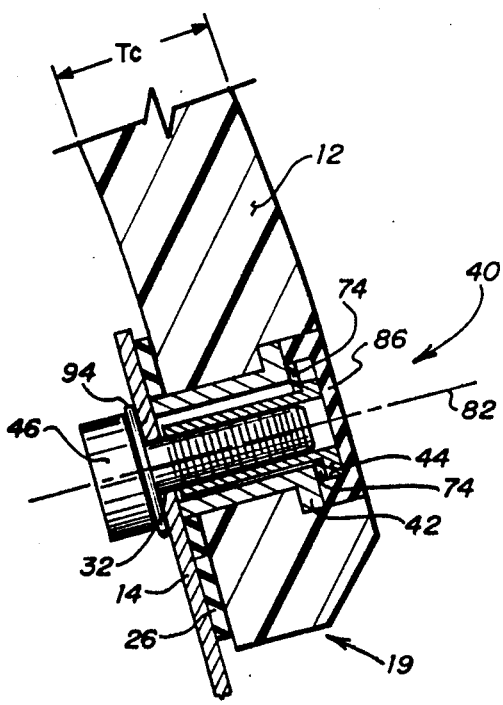
FIG. 4 is a fragmentary cross-sectional view of the blind-fastener as it might appear after being tightened in such a way as to secure a portion of the transparency to the airframe.

In brief, the invention includes a novel fastening combination adapted for quickly and efficiently connecting a first structure to a second structure using a single tool and from just one side of the structures. This fastening combination is particularly useful in the aircraft industry for installing a transparency or canopy-like structure to an airframe.

The invention provides a means for removably securing the transparency to the airframe with a plurality of internally threaded members (or sleeves) and mating fastening bolts. A plurality of associated fastener housings are adapted to be permanently and securely installed near the edges of the transparency. A means is provided for acheiving a mechanical connection between each sleeve and its associated housing in such a way that torque applied by the fastening bolt to the sleeve will be resisted by the housing—and in turn by the mounting structure or transparency to which the housing is anchored. That is, the mechanical connecting means between the housing and sleeve is configured such that when the bolt is being turned so as to tighten the sleeve and bolt together, rotation of the bolt's associated sleeve (about the longitudinal axis of the fastener) will be blocked against unrestricted movement. With this construction, engagement of the fasteners for the transparency may be accomplished from only one side of the thereof. Thus, the invention described herein may be commonly referred to as a "blind" fastener.

The hollow, cylindrical housing of each blind fastener has a top and a bottom, and the housing is counterbored so as to provide a transversely extending shoulder therein. The sleeve may be selectively inserted into the housing, with the sleeve having a radially extending lip at one end that prevents the sleeve from passing all the way through the housing. Ideally, the mechanical connecting means (i.e., the housing and sleeve interlocking structure) constitutes at least one opening in the housing top, with the opening being configured to receive a protruding element that is affixed to the sleeve. One end of the opening constitutes a longitudinally extending shoulder that is adapted to accommodate compressive loads. The sleeve may be inserted into and rotated with respect to the housing, so that the protruding element of the sleeve makes contact and bears against the longitudinally extending shoulder of the housing. Of course, the sleeve could have more than one structural element provided thereon; and the housing naturally would have a plurality of longitudinally extending shoulders that are equal in quantity to the number of protruding elements on the sleeve. This novel type of non-destructive interlocking configuration is advantageous in that a fastener may be assembled and tightened (or untightened for disassembly) without mutilating or distorting any of the fastener parts—and the parts may be conveniently reused.

When used to install a transparency to an airframe, the sleeve may be configured such that it is loosely mounted in the housing where it will be movable for at least a small distance in a direction generally parallel to an adjacent edge of the mounting transparency. Such a construction permits "floating action" between the housing and the sleeve in order to facilitate installation and alignment of the transparency over the airframe opening—and to accommodate any differences in the relative expansion and contraction between the transparency and the airframe.

A preferably flexible cap is adapted to be inserted into the housing top, and the cap is effective to inhibit the entrance of contaminants and the like into the fastener. The cap ideally has what may be described as an aerodynamically smooth outer surface; and when the cap is installed into the housing top, said outer surface lies in a plane which is established by the top end of the housing. With this consolidated construction, the cap and housing top cooperate to form a substantially planar and effectively smooth, solid exposed top surface.

DETAILED DESCRIPTION OF THE PREFERRED EMBODIMENTS

Referring initially to FIG. 1, a fragmentary cross-sectional view of a transparency 12 (e.g., a canopy, windshield or window) is shown as it might appear when mounted between a portion of a fuselage 14 and a cockpit fairing 15. Also shown in this figure is an exploded view of a prior-art fastening combination--before it is connected and used to install the transparency or canopy 12 on the fuselage 14. This prior-art fastening combination includes an elongated polycarbonate bushing 16 that has a longitudinally extending throat 17 which is sized and configured so that it may receive a bolt 18 and a mating nut 20; a washer 24 and seal 22 are positioned so as to be captured between the nut and bolt when the combination is assembled. Of course, a plurality of these fasteners are installed around a peripheral edge 19 of the canopy 12 to secure it to the fuselage 14. The fastening bolts 18 are inserted through matching holes 32 that are disposed around the perimeter of the cockpit opening; the bolts also pass through the housing throats 17, so that mating nuts 20 may be placed over the protruding bolt ends. Then, two people are generally required to tighten the nuts and bolts; one person turns and tightens a given bolt 46 from inside the cockpit, while a second person holds a socket or the like over the mating nut 20 (outside the cockpit) to prevent the nut from turning. When all of the fasteners are tightened, the canopy 12 should be firmly held against a large seal 26 disposed between the fuselage 14 and the canopy. A sealant 34 is applied near the edge of the canopy 12 to help prevent any liquids from passing between the fairing 15 and canopy, or under the canopy. Referring next to FIGS. 2 and 3, a new fastening device 40 is shown in accordance with this invention, and it is adapted to be tightened from one end thereof. The fastener 40, which may aptly be called a blind fastener, is oriented and mounted near the peripheral edge of the transparency 12 in much the same way as the prior art fastener mentioned above; but the threaded blind fastener 40 is uniquely configured so that it may easily be tightened by just one person from inside the cockpit 28.

The fastener 40 includes an elongated housing 42, an internally threaded sleeve 44, a fastening bolt 46, and usually various seals 74, 94; this compact, combination device 40 is particularly adapted for use in quickly and efficiently installing a transparency 12 in an aircraft. Of course, the invention described herein could also be used to install a transparency or a panel-like structure in a variety of other vehicles (e.g., portholes in naval vessels, windows in the walls of a train, etc.). However, to provide an example of one specific application, the blind fastener 40 will be described hereinafter as being used to install a canopy over the cockpit of a high-performance jet or the like.

The elongated housing 42 has a top 48, a bottom 50, and a longitudinal bore 52 therethrough; the top of the housing 42 is counterbored so as to form an internal shoulder 72. The housing 42 preferably has a generally cylindrical shape, but its shape depends on the configuration of its associated mounting aperture; thus, the housing exterior could also be shaped like a rectangular prism, circular cone, etc., and the mounting aperture would be similarly shaped. The exterior surface of the housing 42 preferably has a configuration that fosters a rigid connection to some mounting structure 12. That is, at least a portion of the housing surface 84 preferably has a surface roughness of at least 35 microinch, so as to foster non-rotative contact with canopy 12 to which the housing 42 might be attached. The sleeve 44 is adapted to be selectively inserted into the top of housing 42, and the top portion 76 of the sleeve is flared outwardly so as to provide a radially extending lip to assist in preventing the sleeve 44 from passing downwardly through the housing 42. The seal 74 is disposed between the housing shoulder 72 and the sleeve lip 76, so as to inhibit the passage of liquids between the housing 42 and sleeve 44.

The housing top 48 preferably has a pair of longitudinally extending shoulders 54, 56 that are adapted to accommodate compressive loads. A given one of the longitudinally extending shoulders 54, 56 constitutes one edge of an associated longitudinally oriented slot 58, 60 (in the housing wall 62). The slots 58, 60 extend downwardly from the top side of the housing 42 for a distance that is appreciably less than the length of the housing 42; this slot length is represented by the notation $L_s$ in FIG. 3, which is obviously less than the length of the housing ($L_h$). Extending circumferentially around the housing wall 62 for a short distance is a pair of transverse openings 64, 66, with one of the two openings being in communication with the top side of the housing 42 through each of the longitudinally extending slots 58, 60. The size of a given opening 54, 56 is sufficient to accommodate an associated structural element 68, 70 of the sleeve 44. The protruding elements 68, 70 are preferably evenly distributed circumferentially around the sleeve 44; they are ideally located approximately 180 degrees away from each other. Both elements 68, 70 are sized and positioned so that they may bear against the innermost ends or shoulders 54, 56 of the openings 64, 66 when the sleeve 44 is inserted in and rotated counterclockwise with respect to the housing 42 for a short distance. It should be recognized that even though the sleeve 44 preferably has two structural elements 68, 70, it would also function equally well with just a single, properly sized element; alternatively, it could be made to function with more than two elements. Naturally, an alternative embodiment of a housing would be configured to accommodate the quantity and relative positions of the structural elements that are provided on the sleeve.

Turning next to FIG. 4, after the plurality of housing 42 have been installed in the supporting structure (e.g., a canopy peripheral edge represented by the reference numeral 19), the plurality of sleeves 44 are inserted into the housings. Then the fastening bolts 46 are inserted through mounting apertures 32 in the airframe 14. Each bolt 46 is also adapted to pass longitudinally into a given housing 42 from the bottom thereof, and the bolt 46 has a threaded portion 78 which is complementary to an internally threaded portion 80 of the sleeve 44. After the bolt threads 78 are engaged with the sleeve threads 80 (by inserting the bolt 46 into the sleeve 44), the fastener may be tightened by rotating the bolt about its longitudinal axis 82. Any desired amount of torque may be applied to the bolt 46—after the sleeve structural elements 68, 70 come into contact with and then press against the fixed housing shoulders 54, 56 (FIG. 2). With such a construction, the bolt 46 may easily and conveniently be turned and tightened—by just one person—using a tool such as screwdriver or the like. Also, if the sleeve threads 80 should accidentally become stripped, or if the sleeve 44 should need to be replaced for some reason, the sleeve may be selectively removed from the housing 42 at will—and a replacement sleeve may conveniently be substituted for the original sleeve.

A major advantage of this modular fastening configuration is that a threaded fastener 40 is not upset or deformed in any way when it is assembled—or disassembled. Accordingly, the non-destructive, blind fastener 40 disclosed herein is distinquished from other blind fasteners in that the fastener does not require the internally threaded sleeve 44 to be bent, twisted, distorted or mutilated in the process of anchoring the fastener to its supporting structure. In effect, this reusable construction relies on a mechanical interlock—which is 100% reversible—to mount the internally threaded sleeve, so that it may receive a mounting bolt. This is in sharp contrast to other blind fasteners such as those offered by companies like B. F. Goodrich under their trademark RIVNUT.

It should also be recognized that this particular fastener 40 is constructed so that it may be tightened without introducing any compressive stresses in the canopy 12. The height or thickness $L_h$ of the fastener 40 (as shown in FIG. 3) is ideally slightly greater than the thickness of the canopy. Thus, the bottom end 50 of the housing 42 primarily experiences the compressive forces when the fastener is tightened. The canopy thickness is represented by the notation $T_c$ in FIG. 4. This canopy fastening configuration is important because the canopy 12 may be formed of a somewhat brittle, laminated material such as acrylic—which might crack or shatter if it were to experience undesirable compressive forces.

In order to promote ease of assembly between two relatively long or large parts, substantial manufacturing tolerances are often desirable. To this end, the sleeve 44 is made relatively movable with respect to the housing 42 by providing a substantial side clearance between the outside diameter of the sleeve and the inside diameter of the housing. The sleeve outside diameter and housing inside diameter are designated by the notations $D_s$, $D_h$, respectively, as shown in FIG. 3. For probably many aircraft applications, the side clearance between the outside of the barrel-like portion 77 of the sleeve 44 and the inside of the housing 42 is preferably at least 0.060 inch. Of course, the amount of clearance that is required to allow the proper "floating action" between the sleeve and housing will likely depend on the size of the fastener. And it is desirable in some cases to permit a significant amount of relative movement between the housing 42 and a bolt 46 which is engaged with the threaded sleeve 44. With this unique, self-adjusting capability, the fastener 40 is adapted to accommodate appreciable differences in the relative expansion or contraction of the canopy 12 and airframe 14—as a result of airframe flexure during highspeed manuevers, as well as more mundane variations in pressure and temperature.

In some aircraft, it is not uncommon to provide an electrical path—to "ground"—from the canopy 12 to the airframe 14, so that any electricity which might collect on the canopy may be readily discharged therefrom. Accordingly, the housing 42, sleeve 44 and bolt 46 may be formed from an electrically conductive material in order to discharge any unwanted electrical buildup on the canopy 12. In this way, the conductive fastener 40 may establish a ground path from the canopy 12 to the airframe 14. But even though a conductive material is preferred, at least some parts of the fastener could be formed from some other material such as polycarbonate, etc. In addition, to maintain the structural integrity of the fastener 40, the housing and sleeve are preferably made from a material that is at least reasonably resistant to corrosion or deterioration—which can result from overexposure to liquids such as water, solvents, deicing solutions, etc. An exemplary material which would be both electrically conductive and reasonably resistant to deterioration is 6061 aluminum.

Figure 5:
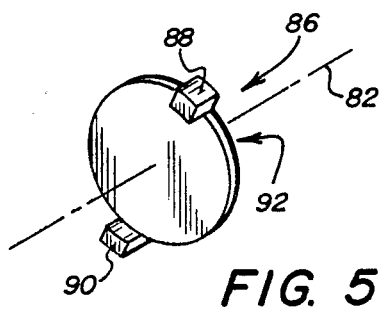
FIG. 5 is a perspective view of the cap showing the inner surface of the cap that faces the sleeve (seen in FIG. 2), said cap having a pair of ears that are circumferentially disposed, with portions of said ears protruding inwardly toward the housing.

Referring additionally to FIG. 5, a cap 86 is sized and configured so as to be secured into the open housing top 48 after the sleeve 44 has been inserted therein. The cap 86 is preferably formed from a rubber-like material, so that it may be gently forced into the housing top 48 in order to help effectively inhibit the entrance of contaminants into the fastener 40. The cap also helps prevent liquids or other undesirable materials from passing through the top of the fastener and coming into contact with the internal sleeve threads 80. In order that the cap 86 will closely conform to the interior of the housing top 48, the cap preferably has a disk-like shape, and it has a pair of circumferentially disposed ears or lugs 88, 90 that are ideally located about 180 degrees apart. The ears 88, 90 are judiciously sized and shaped so that they may be snugly inserted into respective ones of the two longitudinally oriented slots 58, 60. As shown in FIGS. 3 and 4, the ears 88, 90 have downwardly protruding portions that are configured to restrict movement of the sleeve structural elements 68, 70, so as to help preclude them from backing away from the longitudinally extending shoulders 54, 56 (after the fastener 40 has been installed). Furthermore, to provide an aerodynamically smooth exterior, the cap's top surface 92 is substantially planar, and the cap is sized so that the top surface is co-extensive with the housing top 48. With such a construction, the cap surface 92 cooperates with the housing top 48 to form a smooth and effectively solid exposed top when the cap 86 is installed in the housing 42. A suitable cap material is preferably a least somewhat resilient and has a durometer hardness of about 90 (Shore A); such a material is readily available from B. F. Goodrich Company under the name of ESTANE.

Figure 6:
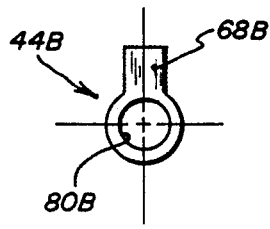
FIG. 6 is another embodiment of the invention showing the top view of a sleeve with a single protruding element that is sized and configured so that it may be inserted into a downwardly extending slot of a housing (shown in FIG. 7)
Figure 7:
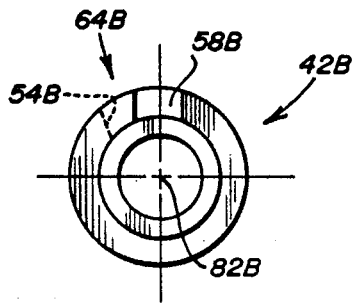
FIG. 7 is a top view of a housing as it might appear when configured to accommodate the single protruding element of the sleeve.

Turning next to FIGS. 6 and 7, a top view of a tubular housing 42B (FIG. 7) is shown as it might appear when configured to accommodate a single structural element 68B of a sleeve 44B (FIG. 6). When the sleeve 44B is installed in the elongated housing 42B, the structural element 68B is pushed longitudinally down the slot 58B of the housing. The sleeve 44B is rotated in a counterclockwise direction (about longitudinal axis 82B) until the left face of structural element 68B bears against the longitudinally extending shoulder 54B which is at the innermost end of the transverse opening 64B. With this configuration, a single structural element 68B may be employed to block rotation of the sleeve 44B when a fastening bolt 46 is engaged with the sleeve threads 80B and turned in a direction to tighten the fastening combination.

In use, a plurality of fastening devices 40 are adapted to efficiently install and replace a canopy 12 in an aircraft. First, the canopy 12 is prepared by drilling a plurality of mounting holes around a peripheral edge 19, so that a quantity of tubular housings 42 can be permanently installed around an edge of the canopy 12 (in accordance with a known hole pattern). A seal 74 is placed around the barrel-like portion 77 of each of the sleeves 44, and then the sleeves are inserted into the housings 42. Each sleeve 44 is rotated in its fixed housing 42 until the protruding structural elements 68, 70 contact their associated shoulders 54, 56. A contaminant-blocking cap or plug 86 is then inserted into the top of each of the fasteners 40. It will be appreciated that, for shipping and installation purposes, a cap 86 is installed in a given fastener 40, and the fastener sleeve 44 is thereby prevented from rotating clockwise (and backing away from the confronting shoulders 54, 56). In this way, the cap 86 not only serves to help block out contaminants, but it also serves as a means for consolidating the fastener—to prevent it from coming apart.

Next, the canopy 12 is positioned over the aircraft cockpit, so that the plurality of fasteners 40 are located adjacent a prepared set of mounting holes in a structural part 14 of the aircraft. A seal 94 is then placed over each of the plurality of bolts 46, and the bolts are inserted through the mounting holes so as to engage the threaded sleeves 44. With such a "blind" fastening construction, the fasteners 40 may be conveniently tightened from inside the cockpit 28 by a single worker who does not need to "see" or handle the now-concealed sleeves 44. In addition, it should be apparent from FIGS. 1-3 that the side clearance between the threaded member 44 and the housing 42 facilitates installation of the canopy 12. This is because each of the threaded members 44 is mounted within its associated housing 42 so as to be movable in a direction perpendicular to an adjacent edge of the canopy 12. Thus, this construction allows a threaded sleeve 44 to be selectively moved in more than one direction in order to accommodate any small alignment problems between a structural hole 32 and a canopy fastener 40.

Figure 8:
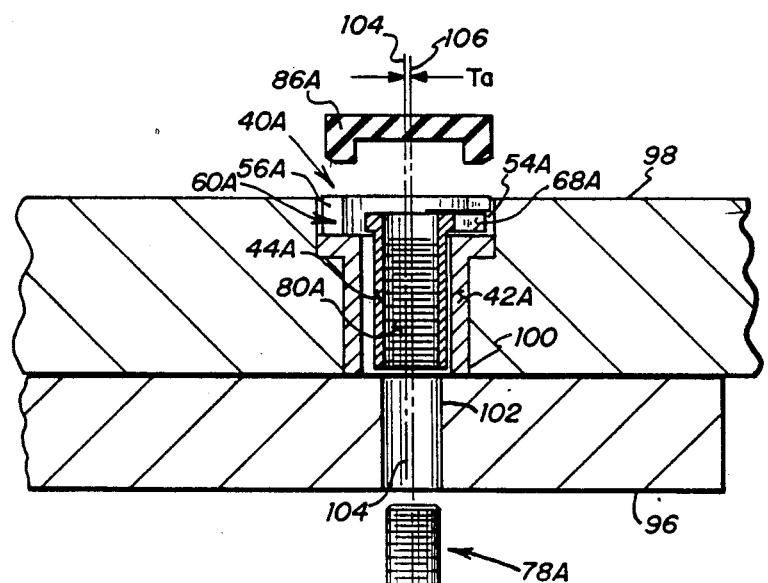

Another way of looking at the broad concept of this invention is to consider the transparency as being exemplary of a first structure and the airframe as being exemplary of a second structure. With this in mind, it should be appreciated that the fastener 40 disclosed herein may be advantageously used to fasten the second structure to the first structure—using only one tool and from only one side of the two structures. In other words, the invention described heretofore could be used to connect a variety of structures other than an aircraft canopy and airframe. For example, as shown in FIG. 8, the threaded fastener 40A could conveniently be used to secure an access panel of some electrical apparatus (represented by the numeral 96) to a console or cabinet (represented by the numeral 98) containing a multitude of electronics gear or the like. With such a fastener 40A, maintenance personnel could handily use a single tool such as a screwdriver, wrench, etc., to quickly disengage the fastener so that the access panel 96 could be removed. And, when the panel 96 is repositioned so that it is juxtaposed with the opening in the cabinet 98, only one of the separable fastener parts needs to be handled to engage and tighten the fastener—so as to securely attach the panel to the cabinet.

More specifically, the threaded fastener 40A used in this example has an internally threaded primary member 44A (similar to the earlier mentioned sleeve 44) which is configured so that it could be supported by a first structure 98 (i.e., the cabinet). A secondary member 46A (having physical characteristics which are like the canopy bolt 46) has external threads 78A which are complementary to the threads 80A of the primary member 44A. And, when the primary and secondary members 44A, 46A are engaged, the secondary member is adapted to bind a second structure (such as the access panel 96) to the cabinet frame 98.

This multi-piece "panel" fastener 40A includes a means for achieving a mechanical connection between the primary member 44A and cabinet 98 in such a way that torque applied by the secondary member 46A to the primary member will be resisted by the cabinet. To foster disassembly of the fastener 40A—without destroying it, the mechanical connection is selectively releasable without the use of any tools; and a person could use just one hand to remove the primary member 44A from the cabinet 98 so as to visually examine the member 44A at will. With this non-destructive fastening configuration, the sleeve member 44A may temporarily be removed from the fastener 40A without the necessity for permanently mutilating any part of the fastener. Therefore, if the primary member 44A were inadvertently damaged or needed to be discarded for some reason (e.g., if the threads were stripped), the primary member may conveniently be replaced with an equivalent member at any desired time.

The mechanical connecting means between the primary member 44A and the cabinet 98 ideally constitutes a combination of two interlocking elements that are sized and configured so as to permit certain relative movement in one direction and to completely inhibit movement in an orthogonal direction. These two interlocking elements function somewhat like the structural element/shoulder combination 68/54 disclosed in the canopy example. The two interlocking elements preferably constitute a protuberance 68A and a complementary recess 54A, with the protuberance 68A extending outwardly from the primary member 44A and the complementary recess 54A being rigidly associated with the cabinet 98; however, a second protuberance 70A and recess 56A may be provided on the primary member 44A and cabinet 98, respectively. Ideally, each complementary recess 54A, 56A is initally formed in an elongated, tubular housing 42A which is subsequently affixed to the cabinet 98.

In some cases the tolerance in the alignment of the cabinet 98 and panel 96 may be relatively loose; accordingly, the "match" between a cabinet mounting aperture 100 and a panel aperture 102 may not be very precise. This is represented in FIG. 8 wherein the longitudinal centerline 104 of the housing 42A and the longitudinal centerline 106 of the primary member 44A are shown as being offset from each other. In order to accommodate an appreciable misalignment which might exist between the cabinet 98 and the access panel 96, the primary member 44A is capable of being moved transversely with respect to the housing 42A in order that it may be brought into alignment with the secondary member 46A. Of course, this amount of relative transverse movement between the members 44A, 46A is only permissible prior to the time that they are fully tightened (by being moved with respect to one another in an axial direction). The construction of fastener 40A obviously permits the primary member 44A to "float" inside the tubular housing 42A, so that the secondary member 46A may readily be inserted through the panel aperture 102 in order to engage the threads 80A. An exemplary transverse movement between the primary member 44A and tubular housing 42A is represented by the notation $T_a$ in FIG. 8. It is noteworthy that the secondary member 46A is inserted into the primary member 44A from the bottom thereof. But the terms top, bottom, and side should be understood to be relative terms and not absolutes. Therefore, the actual orientation of the fastener 40A (or 40) when it is installed is of no consequence to its operation.

When the multi-piece fastener 40A is used to secure the access panel 96 to the cabinet 98, a washer 108 (or similar seal-like structure) may be disposed between the secondary member 46A and the panel—before the primary and secondary members 44A, 46A are engaged; another washer could be used between the primary member and housing 42A. A cap 86A may be inserted into the top of the fastener housing 42A to restrain the primary member 44A so as to facilitate assembly of the fastener 40A. That is, the cap 86A helps to prevent the primary member 44A from backing away from a bolt-like member 46A as it is being pushed into the tubular pieces—as a preliminary step for engaging the associated threads.

While only certain preferred embodiments of the invention are disclosed herein in substantial detail, it should be apparent to those skilled in the art that modifications of various parts of the invention may be accomplished without departing from the spirit of the invention. For example, a second transverse opening (similar to the transverse opening 54) could be provided at the bottom of each slot, with the additional opening extending in the opposite direction from the original transverse opening. This additional opening would provide an opposite shoulder for a structural element to bear against when a fastener is being untightened and a bolt is being turned counterclockwise. Too, the inner face of a cap could have a central protuberance which is sized and configured to "fill in" the top opening of the sleeve, so as to more reliably seal it and to help prevent liquids from passing through the sleeve and coming into contact with the sleeve threads. Obviously, the outer face of the cap need not necessarily be flat, and it could have another shape (e.g., dome-like, etc.). In addition to the disclosed method of securing a transparency (such as a canopy, windshield, window, etc.) in an aircraft, it should also be recognized that the fasteners disclosed herein could have many other applications. Thus, any structure shown herein is intended to be exemplary and is not meant to be limiting, except as described in the claims appended hereto.

What is claimed is:

1. A threaded fastener adapted to be tightened from one end thereof, comprising:

(a) an elongated housing having a top, a bottom, and a longitudinal bore therethrough, the top having a longitudinally extending shoulder adapted to accommodate compressive loads, and the exterior of the housing having a configuration that fosters connection to some mounting structure;
   (b) a sleeve adapted to be selectively insertable into the housing, but being incapable of passing all the way through the housing, said sleeve being internally threaded, and the sleeve having a structural element which is sized and positioned so that it may bear against the longitudinally extending shoulder of the housing when the sleeve is rotated with respect to the housing;
   (c) a cap that is formed from a rubber-like material which snugly fits into the open housing top so as to help prevent contaminants from passing through the top of the fastener and coming into contact with the internal portions of the sleeve; and
   (d) a bolt adapted to pass longitudinally into the housing from the bottom thereof, and the bolt having threads which are complementary to the internal threads in said sleeve, whereby the bolt threads may be selectively engaged with the sleeve threads, and whereby the bolt may be rotated about its axis from the bottom of the fastener, and whereby a desired amount of torque may be applied to the bolt as said structural element on the sleeve bears against the longitudinally extending shoulder of the housing.

2. A threaded fastener adapted to be tightened from one end thereof, comprising:

(a) an elongated housing having a top, a bottom, and a longitudinal bore therethrough, the top having a longitudinally extending shoulder adapted to accomodate compressive loads, and the exterior of the housing having a configuration that fosters connection to some mounting structure, and the top of the housing is counterbored so as to provide an internal shoulder near the top;
   (b) a sleeve adapted to be selectively insertable into the housing, but being incapable of passing all the way through the housing, said sleeve being internally threaded, and the sleeve having a structural element which is sized and positioned so that it may bear against the longitudinally extending shoulder of the housing when the sleeve is rotated with respect to the housing;
   (c) a seal between said housing internal shoulder and the top of the sleeve, whereby the passage of liquids between the housing and the top of the sleeve may be inhibited; and
   (d) a bolt adapted to pass longitudinally into the housing from the bottom thereof, and the bolt having threads which are complementary to the internal threads in said sleeve, whereby the bolt threads may be selectively engaged with the sleeve threads, and whereby the bolt may be rotated about its axis from the bottom of the fastener, and whereby a desired amount of torque may be applied to the bolt as said structural element on the sleeve bears against the longitudinally extending shoulder of the housing.

3. A threaded fastener adapted to be tightened from one end thereof, comprising:

(a) an elongated housing having a top, a bottom, and a longitudinal bore therethrough, the top having a longitudinally extending shoulder adapted to accomodate compressive loads, and the exterior of the housing having a configuration that fosters connection to some mounting structure;

(b) a sleeve adapted to be selectively insertable into the housing, but being incapable of passing all the way through the housing, said sleeve being internally threaded, and the sleeve having a structural element which is sized and positioned so that it may bear against the longitudinally extending shoulder of the housing when the sleeve is rotated with respect to the housing;

(c) a cap which is sized so as to be secured into the open top of the housing after the sleeve has been inserted therein, and the cap being at least partially effective to inhibit the entrance of contaminants into the fastener; and (d) a bolt adapted to pass longitudinally into the housing from the bottom thereof, and the bolt having threads which are complementary to the internal threads in said sleeve, whereby the bolt threads may be selectively engaged with the sleeve threads, and whereby the bolt may be rotated about its axis from the bottom of the fastener, and whereby a desired amount of torque may be applied to the bolt as said structural element on the sleeve bears against the longitudinally extending shoulder of the housing.

4. The threaded fastener as claimed in claim 3 wherein the cap is at least somewhat resilient and has a Shore A durometer hardness within the range of about 85 to 95.

5. The threaded fastener as claimed in claim 3 wherein the cap has a downwardly protruding lug which helps preclude the structural element from backing away from the longitudinally extending shoulder after a fastener has been positioned on some structure.

6. The threaded fastener as claimed in claim 3 wherein the top surface of the cap is substantially planar, and the cap is sized so that its top surface is coextensive with the top of the housing, such that the cap cooperates with the housing top to form a smooth and effectively solid exposed top when the cap is installed in the housing, whereby the top of an installed fastener may be said to have an aerodynamically smooth surface.

7. The threaded fastener as claimed in claim 3 wherein the housing has two spaced and longitudinally oriented slots, and wherein the cap has a pair of ears that are sized and configured so that they may be securely inserted into respective ones of the two longitudinally oriented slots.

8. The threaded fastener as claimed in claim 7 wherein said sleeve has a second structural element, and wherein said ears are configured so that they aid in restricting movement of said first and second structural elements when the sleeve is installed in the housing.

* * * * *